(12) United States Patent
Kim et al.

(10) Patent No.: US 8,260,458 B2
(45) Date of Patent: Sep. 4, 2012

(54) ROBOT, ROBOT HAND, AND METHOD OF CONTROLLING ROBOT HAND

(75) Inventors: Yong Jae Kim, Seoul (KR); Ja Woo Lee, Seoul (KR); Kang Min Park, Seo-gu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 735 days.

(21) Appl. No.: 12/382,122

(22) Filed: Mar. 9, 2009

(65) Prior Publication Data

US 2009/0285664 A1   Nov. 19, 2009

(30) Foreign Application Priority Data

May 13, 2008 (KR) .................. 10-2008-0043773

(51) Int. Cl.
 *G05B 19/18* (2006.01)
(52) U.S. Cl. .................... 700/245; 294/213; 318/568.21
(58) Field of Classification Search .................. 700/245, 700/247, 251, 253, 258–262; 901/30–36, 901/46–47; 294/213; 318/568.11, 568.12, 318/568.2, 568.21
See application file for complete search history.

(56) References Cited

U.S. PATENT DOCUMENTS

| | | | | |
|---|---|---|---|---|
| 4,588,348 A | * | 5/1986 | Beni et al. ..................... | 414/730 |
| 4,980,626 A | * | 12/1990 | Hess et al. ............... | 318/568.16 |
| 5,501,498 A | * | 3/1996 | Ulrich ........................... | 294/106 |
| 7,701,202 B2 | * | 4/2010 | Torres-Jara ................ | 324/207.2 |
| 2004/0103740 A1 | * | 6/2004 | Townsend et al. ......... | 74/490.01 |
| 2006/0012197 A1 | * | 1/2006 | Anderson et al. ............. | 294/106 |
| 2009/0302626 A1 | * | 12/2009 | Dollar et al. .................. | 294/106 |

FOREIGN PATENT DOCUMENTS

GB      2404250 A  *  1/2005
KR   10-2004-0107710     12/2004

* cited by examiner

*Primary Examiner* — Mary Cheung
(74) *Attorney, Agent, or Firm* — Staas & Halsey LLP (57) ABSTRACT

Disclosed are a robot, a robot hand, and a method of controlling the robot hand, in which the robot hand rapidly and correctly approaches an object to be gripped and safely grips the object regardless of the shape and material of the object. The method of controlling a robot hand, which has a palm, and a plurality of fingers, each having a plurality of segments, connected to the palm, includes causing the palm to approach an object using at least one first distance sensor installed on the palm; causing the plurality of fingers to approach the object using at least one second distance sensor installed on the plurality of fingers; and causing the palm and the plurality of fingers to come into contact the object to grip the object.

12 Claims, 13 Drawing Sheets

ROBOT, ROBOT HAND, AND METHOD OF CONTROLLING ROBOT HAND

CROSS-REFERENCE TO RELATED APPLICATIONS

This application claims the benefit of Korean Patent Application No. 2008-0043773, filed May 13, 2008, in the Korean Intellectual Property Office, the disclosure of which is incorporated herein by reference.

BACKGROUND

1. Field

The present invention relates to a robot, and more particularly, to a robot hand having a plurality of fingers and a method of controlling the same.

2. Description of the Related Art

Robots conduct operations in dangerous working environments, repetitive operations, and operations requiring a large force. Recently, robots are used in various fields of medical, military, aerospace, agricultural, and housekeeping industries as well as at industrial sites.

Robots at industrial sites are widely used in various operations including welding, assembling, coating, testing, and transferring. In a robot used in a transferring operation, it is important to safely and correctly grip and transfer an object to be transferred.

Korean Patent Laid-open Publication No. 10-2004-0107710 titled "Object detectable robot gripper" discloses a technique, in which an object is gripped by recognizing the size and position of the object by irradiating at least one beam onto a level portion of the object and receiving at least one beam reflected by the level portion.

The above conventional technique measures the distance with the object by receiving the beam reflected by the object, thus being applied only to an object having a level surface.

Further, the conventional technique measures the distance with the object through a beam reception angle while moving the gripper itself, thus requiring an additional process to move the gripper to measure the distance with the object.

Moreover, the conventional technique uses light, thus being incapable of measuring a transparent object.

SUMMARY

Accordingly, it is an aspect of the present invention to provide a robot, a robot hand, and a method of controlling the robot hand, in which the robot hand rapidly and correctly approaches an object to be gripped and safely grips the object regardless of the shape and material of the object.

Additional aspects and/or advantages will be set forth in part in the description which follows and, in part, will be apparent from the description, or may be learned by practice of the invention.

The foregoing and/or other aspects of the present invention are achieved by providing a method of controlling a robot hand, comprising a palm, and a plurality of fingers, each having a plurality of segments, each of the fingers being connected to the palm, comprising causing the palm to approach an object using at least one first distance sensor installed on the palm; causing the plurality of fingers to approach the object using at least one second distance sensor installed on the plurality of fingers; and causing the palm and the plurality of fingers to come into contact with the object to grip the object.

The plurality of fingers may approach the object in the order from base segments of the plurality of fingers to tip segments of the plurality of fingers. The palm and base segments and tip segments of the plurality of fingers may approach the object concurrently at uniform distance and speed. The method may further include controlling the robot hand such that the object is located at the central portion of the robot hand, prior to the approach of the palm to the object. The method may further include generating a gripping route and causing the robot hand to approach the object along the gripping route, prior to the approach of the palm to the object. The method may further include controlling the robot hand such that the robot hand generates a designated force to safely grip the object.

The at least one first distance sensor and the at least one second distance sensor may be sequentially operated with a time difference, when the distances between the at least one first and second distance sensors and the object are measured, to prevent interference between the at least one first and second distance sensors.

The foregoing and/or other aspects of the present invention are achieved by providing a method of controlling a robot hand, which has a palm, and a plurality of fingers, each having a plurality of segments, connected to the palm, including causing tip segments of the plurality of fingers to approach an object concurrently at a uniform distance and speed using at least one first distance sensor installed on the palm and at least one second distance sensor installed on the tip segments of the plurality of fingers; and causing the tip segments of the plurality of fingers to come into contact with the object to grip the object.

The method may further include controlling the robot hand such that the object is located at the central portion among the tip segments of the plurality of fingers, prior to the approach of the tip segments of the plurality of fingers to the object.

The method may further include, prior to the approach of the tip segments of the plurality of fingers to the object, generating a gripping route; and causing the robot hand to approach the object along the gripping route.

The method may further include controlling the robot hand such that the robot hand generates a designated force to safely grip the object.

The at least one first distance sensor and the at least one second distance sensor may be sequentially operated with a time difference, when the distances between the at least one first and second distance sensors and the object are measured, to prevent interference between the at least one first and second distance sensors.

The foregoing and/or other aspects of the present invention are achieved by providing a method of controlling a robot hand, which has a palm, and a plurality of fingers, each having a plurality of segments, connected to the palm, comprising measuring distances between a plurality of distance sensors, installed on the palm and the plurality of fingers, and an object using the plurality of distance sensors; and determining the shape of the object based on data of the measured distances.

The shape of the object may be determined from the data of the measured distances based on the present position and posture of the robot hand. The posture of the robot hand may be defined by the relative directions and angles of the plurality of fingers to the palm. The plurality of distance sensors may be sequentially operated with a time difference, when the distances between the plurality of distance sensors and the object are measured, to prevent interference between the plurality of distance sensors.

The foregoing and/or other aspects of the present invention are achieved by providing a robot hand including a palm; a plurality of fingers, each having a plurality of segments, connected to the palm; and distance sensors installed on the palm and at least one of the plurality of fingers.

The robot hand may further include contact sensors installed on the palm and at least one of the plurality of fingers. The distance sensors and the contact sensors may be respectively integrated into a single sensor module. The sensor module may be made of a Piezo film. The distance sensors may be buried under the outer layer of the skin of the robot hand. The distance sensors may be buried to a designated depth under the outer layer of the skin of the robot hand.

The plurality of segments may include a base segment and a tip segment. The distance sensors may be installed on at least one of the base segment and the tip segment of each of the plurality of fingers.

The plurality of the segments may further include a middle segment between the base segment and the tip segment; and the distance sensors are installed on at least one of the base segment, the middle segment, and the tip segment of each of the plurality of fingers.

The distance sensors may include at least one first distance sensor installed on the palm to measure a long distance; and at least one second distance sensor installed on at least one of the plurality of fingers to measure a short distance.

The distance sensors may include any one or a combination of at least two selected from the group including of an ultrasonic sensor, an infrared sensor, a laser sensor, or a position sensitive device (PSD).

The foregoing and/or other aspects of the present invention are achieved by providing a robot including a robot hand including a palm, a plurality of fingers, each having a plurality of segments, the fingers being connected to the palm, and distance sensors installed on the palm and at least one of the plurality of fingers; an arm, to which the robot hand is connected such that the robot hand has a degree of freedom; and an image device to obtain an image around the robot.

The robot may further include a calculating unit to control the robot hand and the arm based on measured results of the distance sensors, wherein the calculating unit controls the robot hand such that the robot hand approaches an object based on distance measured results between the robot hand and the object using the image device, and grips the object based on distance measured results between the robot hand and object using the distance sensors.

BRIEF DESCRIPTION OF THE DRAWINGS

These and/or other aspects and advantages of the invention will become apparent and more readily appreciated from the following description of the embodiments, taken in conjunction with the accompanying drawings in which.

DETAILED DESCRIPTION OF EMBODIMENTS

Reference will now be made in detail to the embodiments, examples of which are illustrated in the accompanying drawings, wherein like reference numerals refer to the like elements throughout. The embodiments are described below to explain the present invention by referring to the figures.

Figure 1:
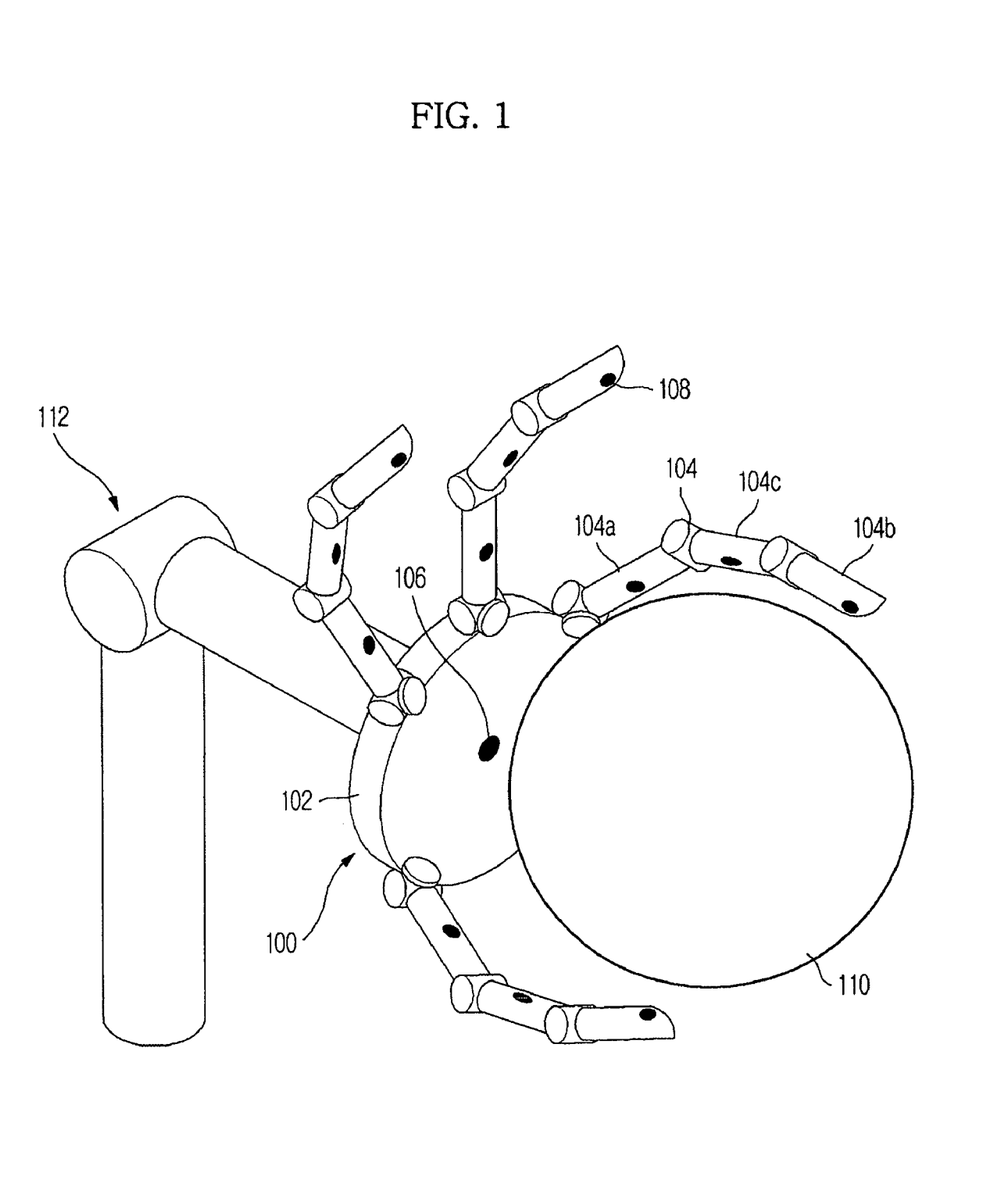
FIG. 1 is a view illustrating a robot hand in accordance with a first embodiment of the present invention.

FIG. 1 is a view illustrating a robot hand in accordance with a first embodiment of the present invention. As shown in FIG. 1, a robot hand 100 in accordance with the first embodiment includes a palm 102, and a plurality of fingers 104 connected to the palm 102. Each of the plurality of fingers 104 includes a plurality of segments 104a, 104b, and 104c.

The fingers 104 are connected to the palm 102 by joints. A distance sensor 106, which will be described later, is installed on the palm 102.

Each of the fingers 104 includes a base segment 104a connected directly to the palm 102, a tip segment 104b forming the tip of each of the fingers 104, and a middle segment 104c between the base segment 104a and the tip segment 104b. The middle segment 104c may not be provided or two or more middle segments 104 may be provided, according to the flexibility required by the fingers 104. Further, the tip segment 104b may not be provided and each of the fingers 104 may include only the base segment 104a, as the occasion demands.

At least one distance sensor 106 is installed on the palm 102, and distance sensors 108 are installed on the plurality of the fingers 104. Here, one distance sensor 108 may be installed on any one of the plurality of the fingers 104, or at least one distance sensor 108 may be installed on each of the segments 104a, 104b, and 104c of all the fingers 104. Further, the distance sensor 108 may be installed only on the base segment 104a, the tip segment 104b, or the middle segment 104c of each of the fingers 104. That is, the distance sensors 106 and 108 may be selectively installed on the palm 102 and at least any one of the plurality of the segments 104a, 104b, and 104c of the plurality of the fingers 104.

The distance sensors 106 and 108 serve to detect a distance between the robot hand 100 and an object 110 when an operation using the robot hand 100 is carried out. The distance sensors 106 and 108 employ any one of sensors, which can sense a distance, such as an ultrasonic sensor, a laser sensor, and an infrared sensor.

In the case of an ultrasonic sensor, the higher the frequency is, the narrower the detecting range of the ultrasonic sensor becomes. In this case, the ultrasonic sensor is excessively directional. Thus, in order to more stably measure the distance, the ultrasonic sensor may have a slightly wide detecting range. At this time, a measure is taken to cope with the interference between a plurality of ultrasonic sensors. As the measure to cope with the interference between the plurality of ultrasonic sensors, the plurality of ultrasonic sensors are respectively operated with a time difference. That is, when ten ultrasonic sensors are prepared, the ten ultrasonic sensors are sequentially operated one by one, and thus it is possible to prevent the generation of interference between the plurality of ultrasonic sensors. An ultrasonic sensor has a short time taken to receive reflected ultrasonic waves after the emission of ultrasonic waves. Although there is a difference of time according to products, even when ten ultrasonic sensors are operated with a time difference, the overall operating time is only approximately 0.1 second and thus scarcely limits the controlled speed of the robot hand.

Further, as the occasion demands, a single robot band 100 may use combinations of ultrasonic, laser, and infrared sensors. For example, a laser sensor measuring a long distance is installed on the palm 102 of the robot hand 100, and an ultrasonic sensor measuring a short distance is installed on the plurality of the fingers 104. In this case, when the distance between the robot hand 100 and the object 110 is comparatively long, the laser sensor is used to measure the distance between the robot hand 100 and the object 110. Further, when the distance between the robot hand 100 and the object 110 is comparatively short, the ultrasonic sensor is used to measure the distance between the robot hand 100 and the object 110. Since the ultrasonic sensor is low-priced compared with the laser sensor, the combination of the laser sensor and the ultrasonic sensor makes both the measurement of a long distance and the measurement of a short distance possible, and provides a cost-saving effect. However, in an applied field not requiring the measurement of a long distance, all sensors may employ a short distance sensor, such as an ultrasonic sensor. Further, the combination of an infrared sensor and a position sensitive device (PSD) is possible.

Contact sensors (not shown) are installed on the robot hand 100 also. The contact sensors sense whether or not the robot hand 100 contacts the object 110, and measure a force applied to the robot hand 100 when the robot hand 100 contacts the object 100. The measurement of the force is used to determine the control range of the robot hand 100 required to conduct an operation, such as gripping of the object 110 by the robot hand 100.

The palm 102 of the robot hand 100 is connected to an arm 112 at a degree of freedom of at least 1. The arm 112 has a single rod shape, or includes a plurality of segments, as the occasion demands. The arm 112 extends the movement range of the robot hand 100.

Figure 2A:
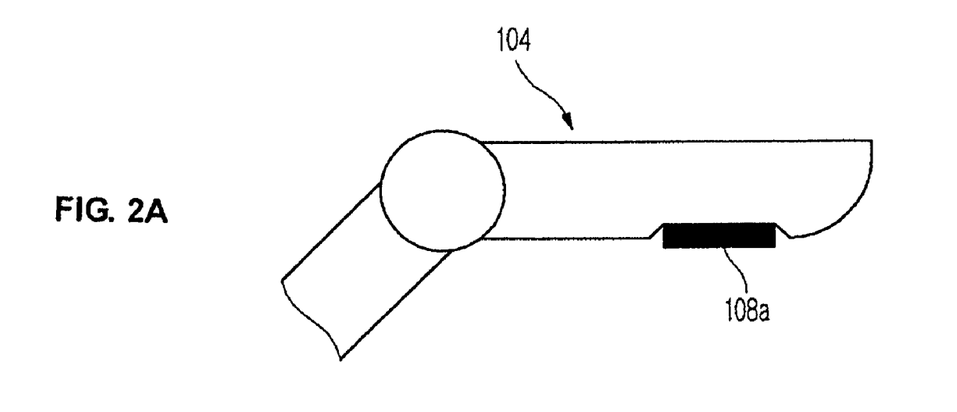
FIGS. 2A to 2C are views illustrating structures of a distance sensor and a contact sensor installed on the robot hand of FIG. 1.
Figure 2B:
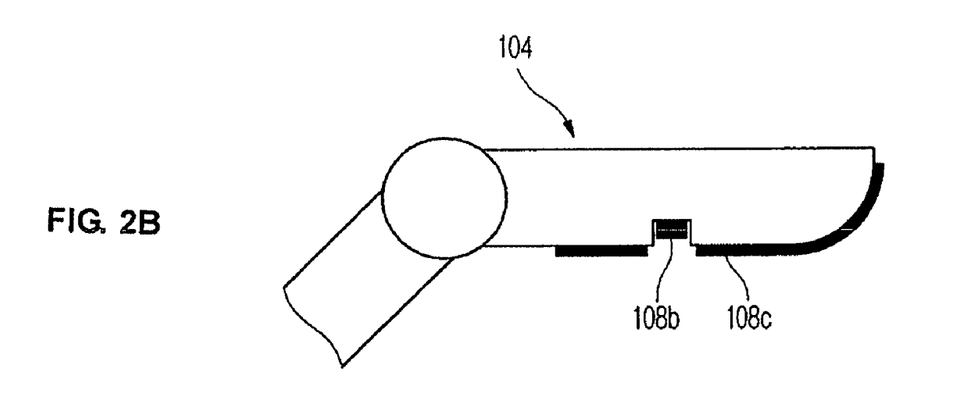
Figure 2C:
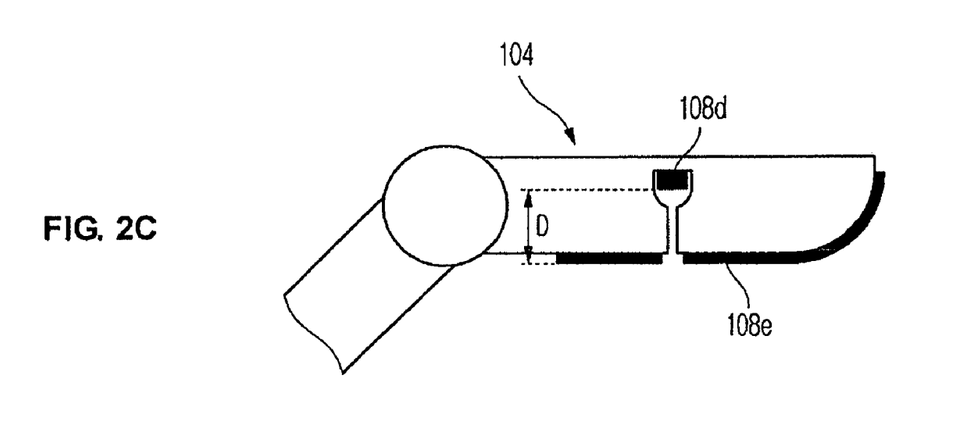

FIGS. 2A to 2C are views illustrating structures of a distance sensor and a contact sensor installed on the robot hand of FIG. 1. FIG. 2A illustrates a single sensor module 108a, into which a distance sensor and a contact sensor are integrated. That is, the sensor module 108a, which is made of a Piezo film, transmits and receives ultrasonic waves through the Piezo film, and thus measures the distance between the robot hand 100 and the object 110. Further, the sensor module 108a, which is made of the Piezo film, detects force generated when the object 110 contacts the sensor module 108a of the robot hand 100, and thus detects whether or not the object 110 contacts the robot hand 100 and a force applied when the object 110 contacts the robot hand 100.

FIG. 2B illustrates a distance sensor 108b and a contact sensor 108c, which are separated from each other and the distance sensor 108b is buried just under the outer layer of the skin of the finger 104. The contact sensor 108c detects whether or not the object 110 contacts the contact sensor 108c, and thus is installed throughout the wide area of the surface of the palm 102 or the finger 104 as much as possible. On the other hand, the distance sensor 108b does not require direct contact with the object 110, and thus is buried just under the outer layer of the skin of the palm 102 or the finger 104 such that the distance sensor 108b can be protected from external impact.

FIG. 2C illustrates a distance sensor 108d and a contact sensor 108e, which are separated from each other and the distance sensor 108d is buried to a designated depth under the finger 104. Many kinds of distance sensors generate a sound wave, an electric wave, or light, detect the change of the state (for example, the variation of frequency or the amount of light) of the sound wave, the electric wave, or the light, which is reflected by an object and then returned, and measure a distance between the distance sensor and the object through the detection result. Accordingly, when the distance between the distance sensor and the object is excessively short, the accuracy of the measured distance result may be lowered. Thus, it is necessary to maintain at least a designated distance between the distance sensor and the object. As shown in FIG. 2C, when the distance sensor 108d is buried to a designated depth under the finger 104, although the object 110 approaches the robot hand 100 closely, the distance between the distance sensor 108d and the object 110 is maintained at the distance (D) between the surface of the distance sensor 108d and the surface of the finger 104, and thus the accuracy in measuring at least a designated distance is obtained.

The contact sensors 108c and 108e of FIGS. 2B and 2C may be made of the Piezo film, which is described above. Further, the structures of the sensors of FIGS. 2A to 2C are applied to sensors installed on the palm 102 as well as the finger 104.

Figure 3:
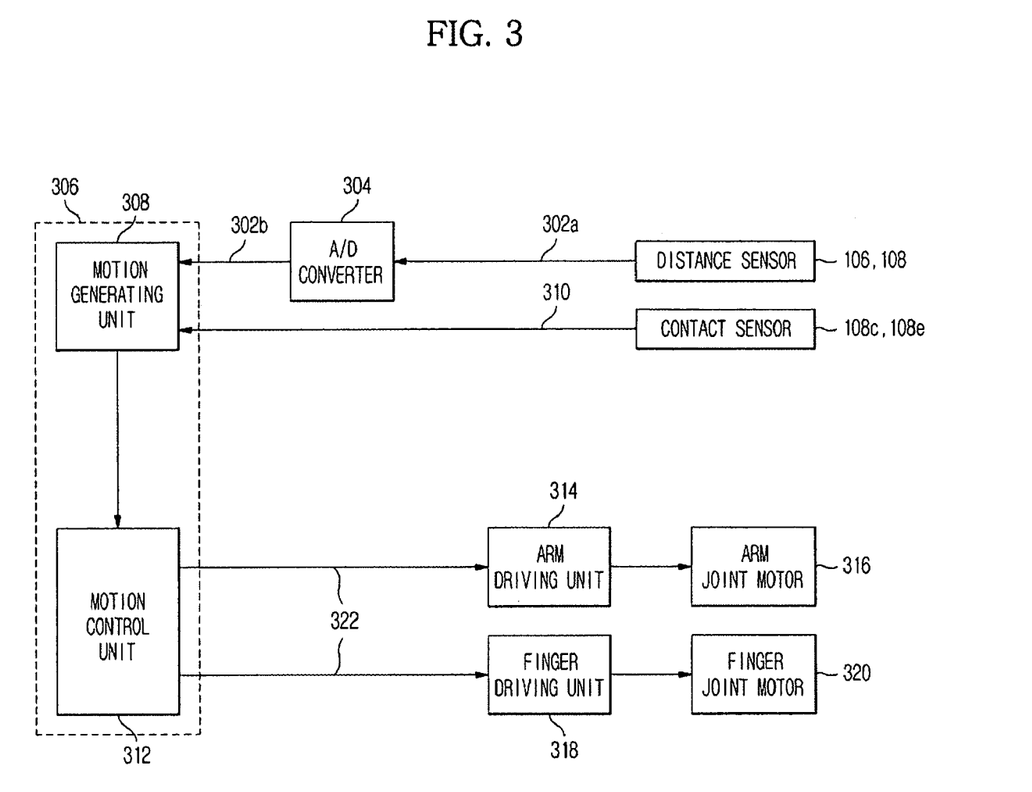
FIG. 3 is a block diagram illustrating a control system of the robot hand of FIG. 1 to FIGS. 2A to 2C.

FIG. 3 is a block diagram illustrating a control system of the robot hand of FIG. 1 to FIGS. 2A to 2C. As shown in FIG. 3, the distance sensors 106 and 108 measure distance data between the distance sensors 106 and 108 and the object 110, and generate an analog distance signal 302a. An analog/digital converter (hereinafter, referred to as an 'A/D converter') 304 converts the analog distance signal 302a into a digital distance value 302b, and transmits the digital distance value 302b to a motion generating unit 308 of a calculating unit 306. The contact sensors 108c and 108e generate an ON/OFF-type digital contact signal 310 according to whether or not the object 110 contacts the contact sensors 108c and 108e, and transmit the digital contact signal 310 to the motion generating unit 308. When the contact sensors 108c and 108e not only detect whether or not the contact sensors 108c and 108e contact the object 110, but also measure an applied pressure generated when the contact sensors 108c and 108e contact the object 110, the contact sensors 108c and 108e generate an analog pressure signal representing the degree of the applied pressure when the contact sensors 108c and 108e contact the object 110, and A/D converter 304 converts the analog pressure signal into a digital pressure value and transmits the digital pressure value to the motion generating unit 308 of the calculating unit 306.

The motion generating unit 308 expects a target motion of the robot hand 100 and the arm 112 based on the digital distance value 302b and the digital contact signal 310, and transmits corresponding data to a motion control unit 312. The target motion is a motion, which is taken by the robot hand 100, in order to conduct an operation given to the robot hand 100. The motion control unit 312 receives the data of the expected target motion, and generates a target control input 322 controlling the robot hand 100 and the arm 112 (including a wrist joint). Here, the target control input 322 includes target speeds and target torques of motors. The target control input 322 generated by the motion control unit 312 is used to control an arm joint motor 316 through an arm driving unit 314 and control a finger joint motor 320 through a finger driving unit 318.

In the control system of the robot hand of FIG. 3, the robot hand 100 approaches the object 110 using coordinate value-type position data of the object 110, which are obtained in advance by a method, such as mapping. That is, relative position data of the object 110 in the type of coordinate values against a base (not shown), on which the arm 112 is mounted, are obtained in advance and stored. Then, when the robot hand 100 is controlled and conducts an operation to the object 100, the robot hand 100 approaches the object 110 by controlling the arm 112 based on the relative position data. Here, the used position data (coordinate values) of the object 110, which represent the approximate position of the object 110, are enough. After the robot hand 110 approaches the vicinity of the object 110, the robot hand 110 approaches the object 110 more closely by sensing the distance with the object 110 using the distance sensors 108.

Figure 4:
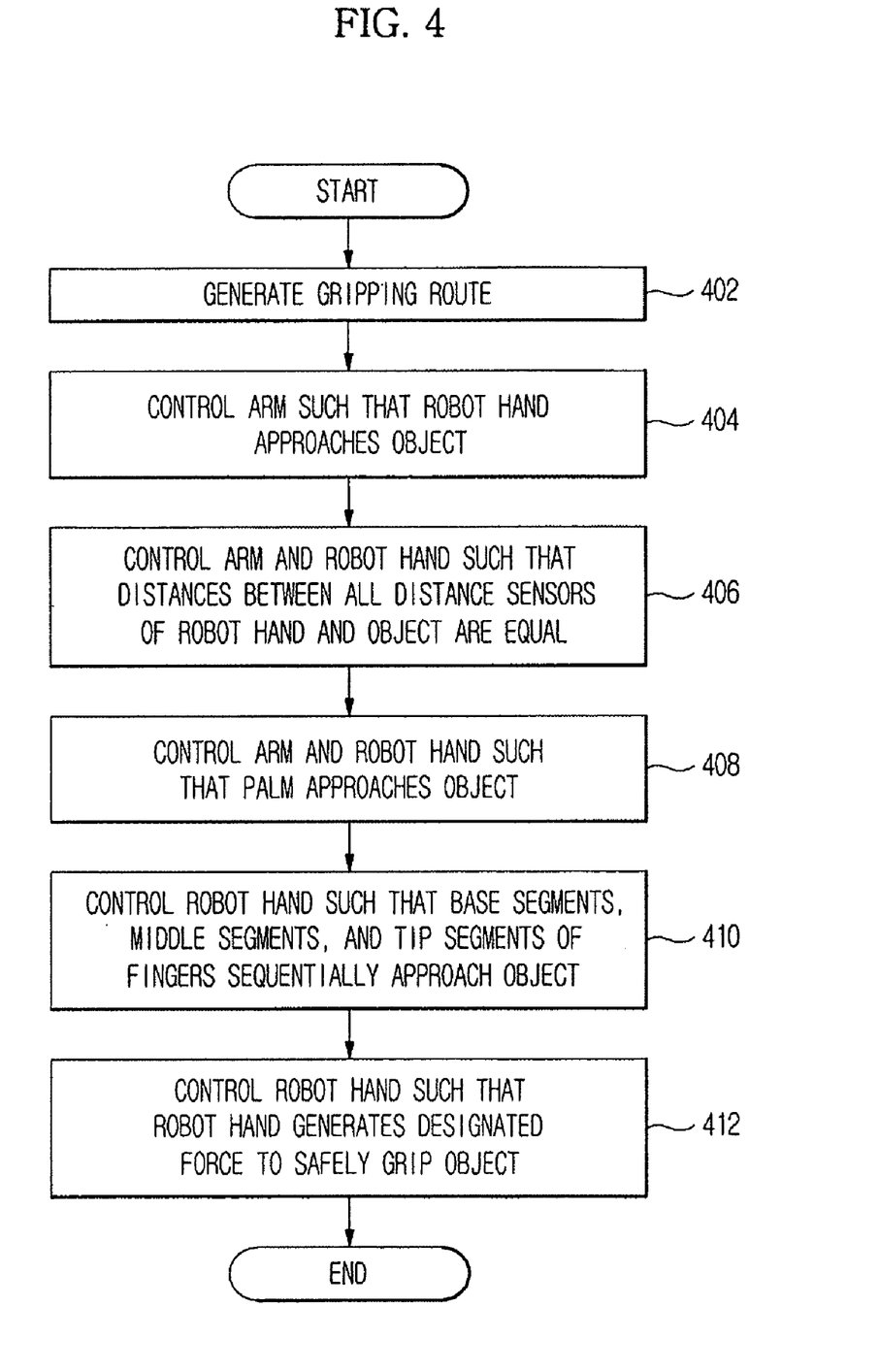
FIG. 4 is a flow chart illustrating a method of controlling a robot hand in accordance with a second embodiment of the present invention.

FIG. 4 is a flow chart illustrating a method of controlling a robot hand in accordance with a second embodiment of the present invention, and FIGS. 5A to 5E are views illustrating operating states of the robot hand controlled by the method of FIG. 4. In FIG. 4 and FIGS. 5A to 5E, an operation given to the robot hand 100 is to grip the object 110. As shown in FIG. 4 and FIGS. 5A to 5E, a gripping route, i.e., a moving route of the robot hand 100 for approaching the object 110, is generated (402). The gripping route is generated based on the relative position data of the object 110 against the robot hand 100, which are provided in advance. The arm 112 is controlled such that the robot hand 100 approaches the object 110 along the gripping route (404).

Figure 5A:
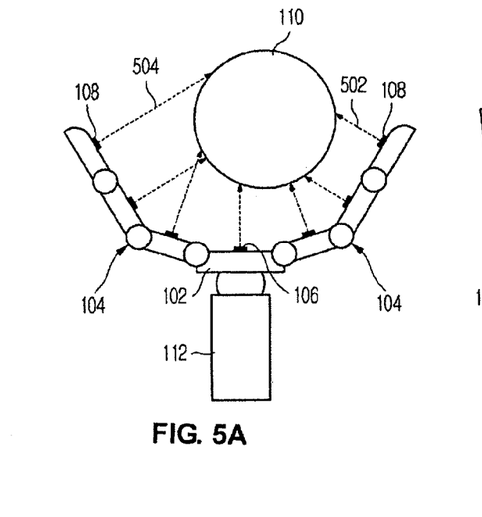
FIGS. 5A to 5E are views illustrating operating states of the robot hand controlled by the method of FIG. 4.
Figure 5B:
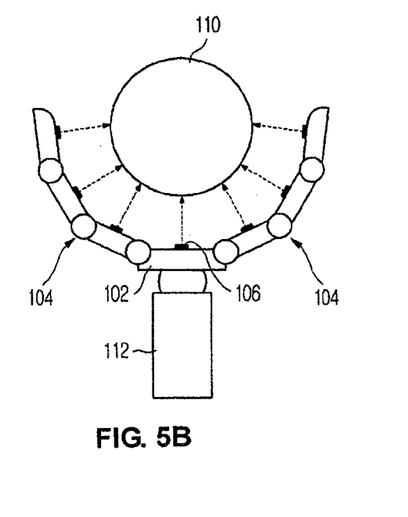

When the robot hand 100 approaches the object 110, the arm 112 and the robot hand 100 are controlled such that the distances between all the distance sensors 108 of the robot hand 100 and the object 110 are equal (406). Although the robot hand 100 approaches the object 110 by the control of the arm 112, the robot hand 100 cannot reach a correct position to grip the object 110. That is, as shown in FIG. 5A, when the robot hand 100 slightly deviates from the position of the object 110, a measured distance 502 and another measured distance 504 differ from each other (i.e., the distance 502<the distance 504). Therethrough, the robot hand 100 recognizes that the object 110 to be gripped is not located at the center of the robot hand 100 but is closer to one side of the robot hand 100 (to the measured distance 502). In order to correctly grip the object 110, the object 110 to be gripped is located at the central portion of the robot hand 100, i.e., the center among the plurality of the fingers 104. Thus, the position of the robot hand 100 and the respective postures of the fingers 104 are controlled such that the object 110 can be located at the center among the plurality of fingers 104, as shown in FIG. 5B (408).

Figure 5C:
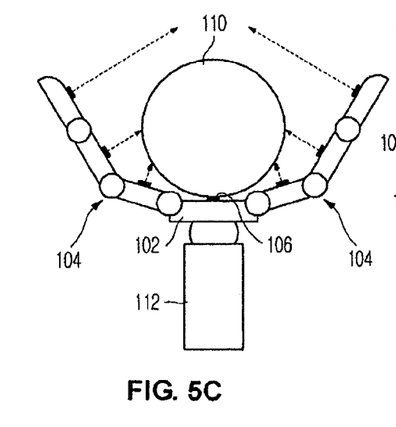

In order to substantially grip the object 110, the arm 112 is controlled while measuring the distance between the palm 102 and the object 110 through the distance sensor 106 of the palm 102, and thus allows the palm 102 to approach the object 110 (with reference to FIG. 5C). Thereafter, the base segments 104a, the middle segments 104c, and the tip segments 104b of the respective fingers 104 sequentially approach the object 110, and thus the contact between the robot hand 100 and the object 110 is achieved (410; with reference to FIGS. 5D and 5E).

Figure 5D:
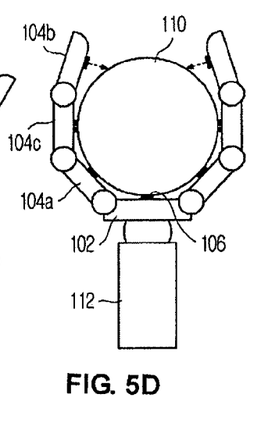
Figure 5E:
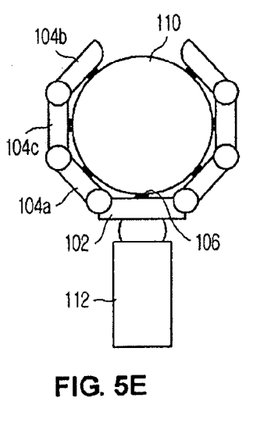

When an excessively large force is applied to cause the palm 102 to come into contact with the object 110, the position of the object 110 may be changed or the object 110 may be damaged. Thus, only a force as great as that of the palm 102 coming into contact with the object 110 is applied. Thereafter, the base segments 104a, the middle segments 104c, and the tip segments 104b of the respective fingers 104 sequentially come into contact with the object 110 while increasing the force, and the robot hand 100 generates a designated force to safely grip the object 110, and thus grips the object 110 (412).

As described above, when the base segments 104a, the middle segments 104c, and the tip segments 104b of the respective fingers 104 sequentially come into contact with the object 110 when the robot hand 100 grips the object 110, it is possible to comparatively safely grip the object 110, although the object 110 is made of a fragile material.

Figure 6:
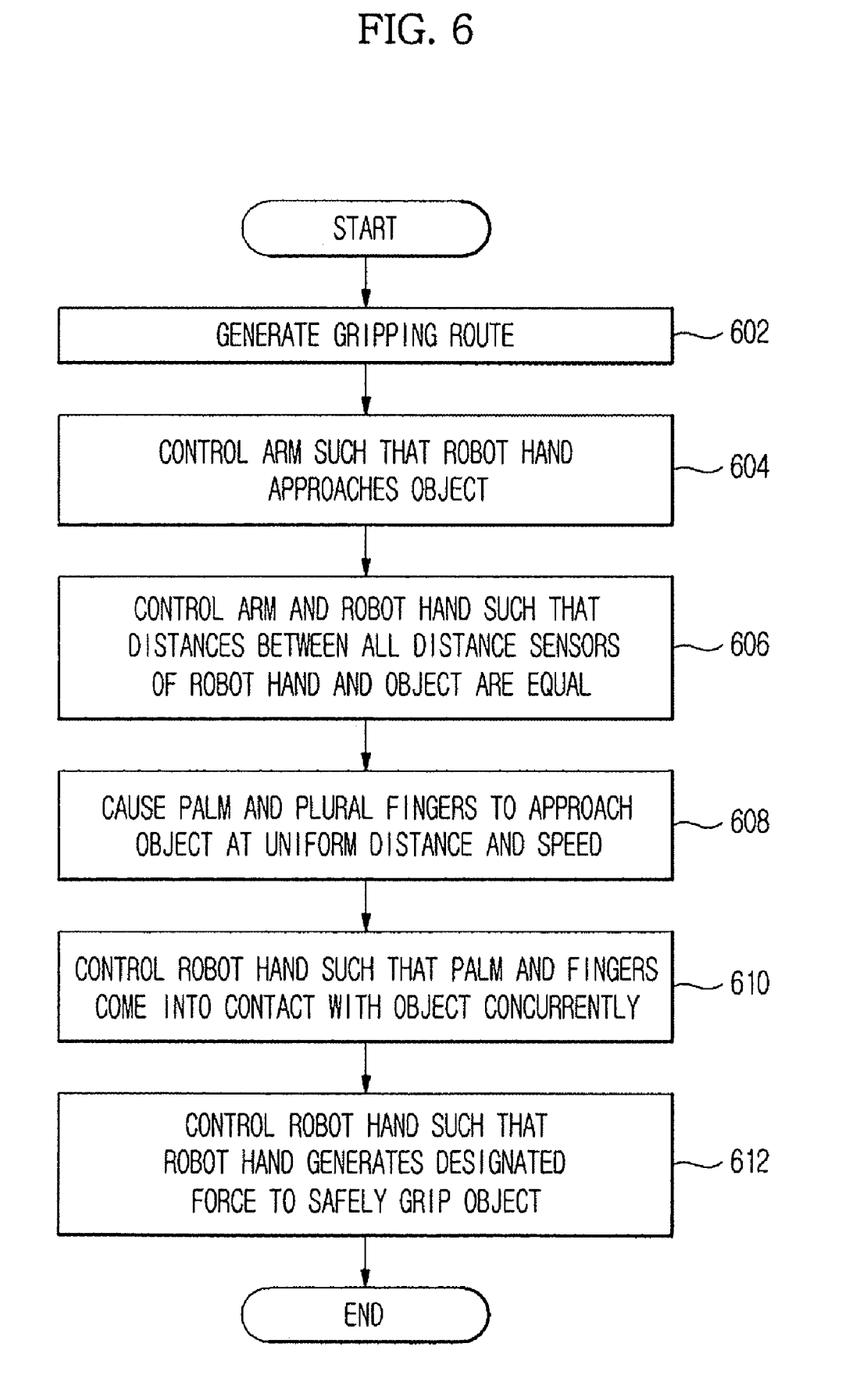
FIG. 6 is a flow chart illustrating a method of controlling a robot hand in accordance with a third embodiment of the present invention.

FIG. 6 is a flow chart illustrating a method of controlling a robot hand in accordance with a third embodiment of the present invention, and FIGS. 7A to 7D are views illustrating operating states of the robot hand controlled by the method of FIG. 6. In FIG. 6 and FIGS. 7A to 7D, an operation given to the robot hand 100 is to grip the object 110. As shown in FIG. 6 and FIGS. 7A to 7D, a gripping route, i.e., a moving route of the robot hand 100 approaching the object 110, is generated (602). The gripping route is generated based on the relative position data of the object 110 against the robot hand 100, which are provided in advance. The arm 112 is controlled such that the robot hand 100 approaches the object 110 along the gripping route (604).

Figure 7A:
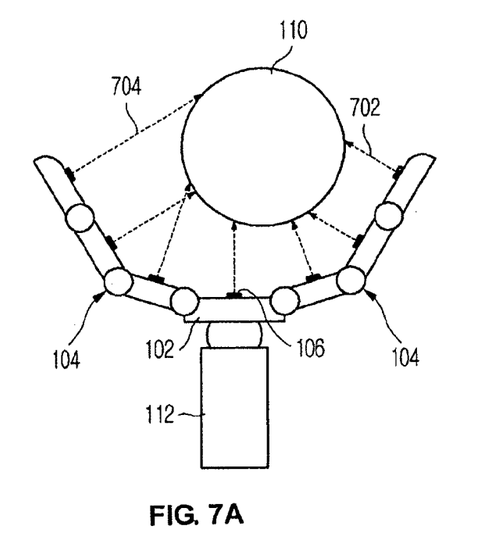
FIGS. 7A to 7D are views illustrating operating states of the robot hand controlled by the method of FIG. 6.
Figure 7B:
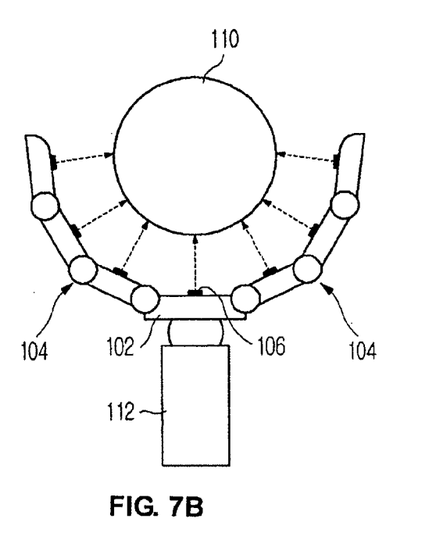

When the robot hand 100 approaches the object 110, the arm 112 and the robot hand 100 are controlled such that the distances between all the distance sensors 108 of the robot hand 100 and the object 110 are equal (606). Although the robot hand 100 approaches the object 110 by the control of the arm 112, the robot hand 100 cannot reach a correct position to grip the object 110. That is, as shown in FIG. 7A, when the robot hand 100 slightly deviates from the position of the object 110, a measured distance 702 and another measured distance 704 differ from each other (i.e., the distance 702<the distance 704). Then, the robot hand 100 recognizes that the object 110 to be gripped is not located at the center of the robot hand 100 but is closer to one side of the robot hand 100 (to the measured distance 702). In order to correctly grip the object 110, the object 110 to be gripped is located at the central portion of the robot hand 100, i.e., the center among the plurality of the fingers 104. Thus, the position of the robot hand 100 and the respective postures of the fingers 104 are controlled such that the object 110 can be located at the center among the plurality of fingers 104, as shown in FIG. 7B.

Figure 7C:
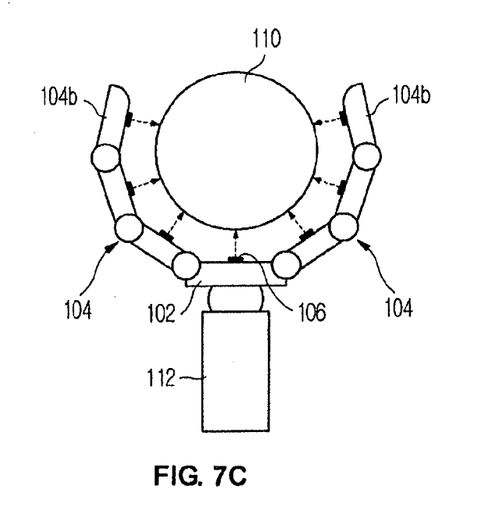
Figure 7D:
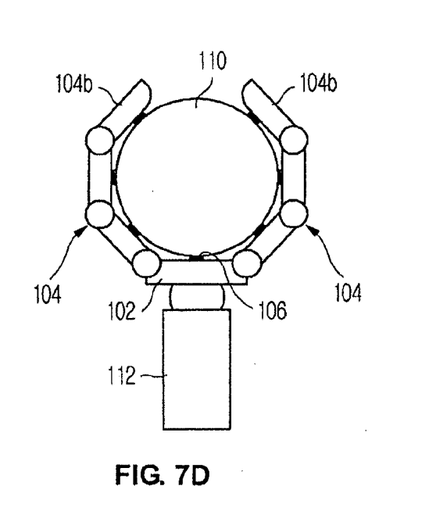

In order to substantially grip the object 110, the palm 102 and the plurality of fingers 104 respectively approach the object 110 at uniform distance and speed (608; with reference to FIG. 7C). The distances between the palm 102 and the plurality of fingers 104 and the object 110 are gradually decreased while the distances between the palm 102 and the plurality of fingers 104 and the object 110 are equally maintained. When the palm 102 and the plurality of fingers 104 approach the vicinity of the object 110, the robot hand 100 is controlled such that the palm 102 and the plurality of fingers 104 come into contact with the object 110 concurrently (610; with reference to FIG. 7D). Thereafter, the robot hand 100 generates a designated force to safely grip the object 110, and thus grips the object 110 (612).

As described above, when the palm 102 and the plurality of fingers 104 come into contact with the object 110 concurrently when the robot hand 100 grips the object 110, it is possible to more rapidly grip the object 110, compared with the case that the middle segments 104c, and the tip segments 104b of the respective fingers 104 sequentially come-into contact with the object 110.

Figure 8:
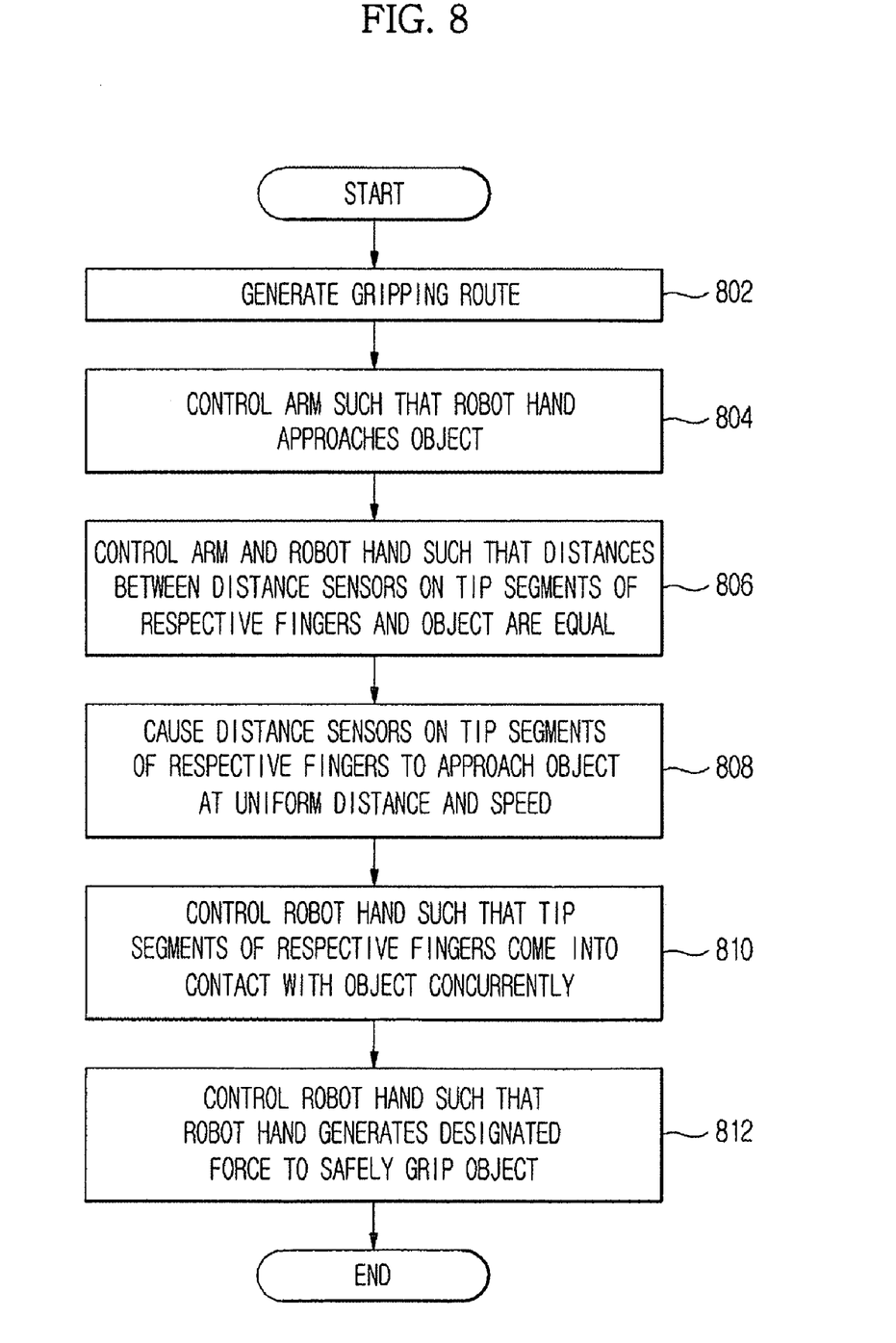
FIG. 8 is a flow chart illustrating a method of controlling a robot hand in accordance with a fourth embodiment of the present invention.

FIG. 8 is a flow chart illustrating a method of controlling a robot hand in accordance with a fourth embodiment of the present invention, and FIGS. 9A to 9D are views illustrating operating states of the robot hand controlled by the method of FIG. 8. In FIG. 8 and FIGS. 9A to 9D, an operation given to the robot hand 100 is to grip the object 110 having a much smaller size than that of the robot hand 100. As shown in FIGS. 9A to 9D, the object 110 has a quite small size, and thus can be sufficiently gripped by only the tip segments 108b of the plurality of fingers 104 without using the whole robot hand 100. As the occasion demands, the object 110 can be gripped by only the tip segments 108b of two fingers 104. Thus, the distances between the plurality of fingers 104 and the object 110 are measured by only the distance sensors 108 installed on the tip segments 104b of the plurality of the fingers 104. As shown in FIG. 8 and FIGS. 9A to 9D, a gripping route, i.e., a moving route of the robot hand 100 for approaching the object 110, is generated (802). The gripping route is generated based on the relative position data of the object 110 against the robot hand 100, which are provided in advance. The arm 112 is controlled such that the robot hand 100 approaches the object 110 along the gripping route (804).

Figure 9A:
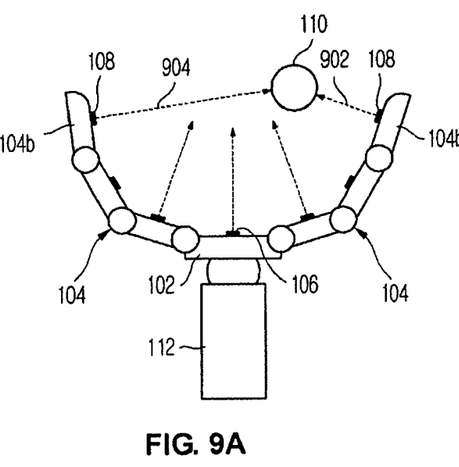
FIGS. 9A to 9D are views illustrating operating states of the robot hand controlled by the method of FIG. 8.
Figure 9B:
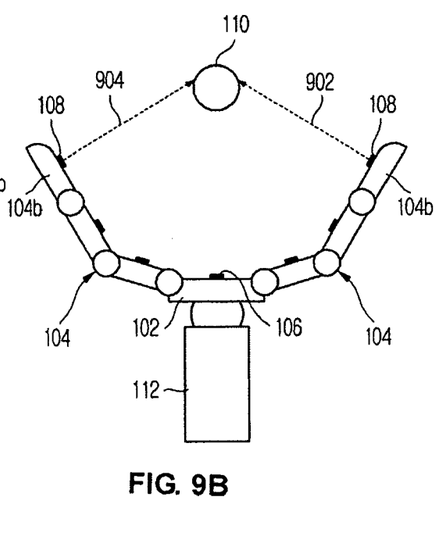

When the robot hand 100 approaches the object 110, the arm 112 and the robot hand 100 are controlled such that the distances between the distance sensors 108 installed on the tip segments 104b of the plurality of fingers 104 and the object 110 are equal (806). Although the robot hand 100 approaches the object 110 by the control of the arm 112, the robot hand 100 cannot reach a correct position to grip the object 110. That is, as shown in FIG. 9A, when the robot hand 100 slightly deviates from the position of the object 110, a measured distance 902 and another measured distance 904 differ from each other (i.e., the distance 902<the distance 904). Therethrough, the robot hand 100 recognizes that the object 110 to be gripped is not located at the center of the robot hand 100 but is closer to one side of the robot hand 100 (to the measured distance 902). In order to correctly grip the object 110, the object 110 to be gripped is located at the central portion of the robot hand 100, i.e., the center among the plurality of the fingers 104. Thus, the position of the robot hand 100 and the respective postures of the fingers 104 are controlled such that the object 110 can be located at the center among the plurality of fingers 104, as shown in FIG. 9B.

Figure 9C:
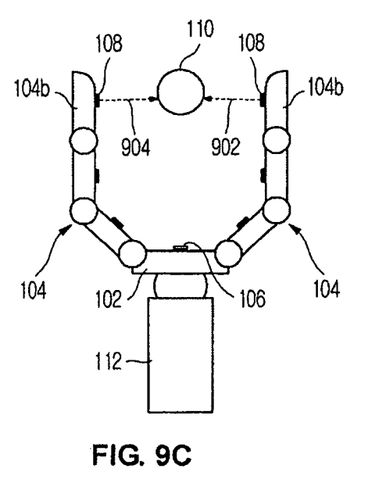
Figure 9D:
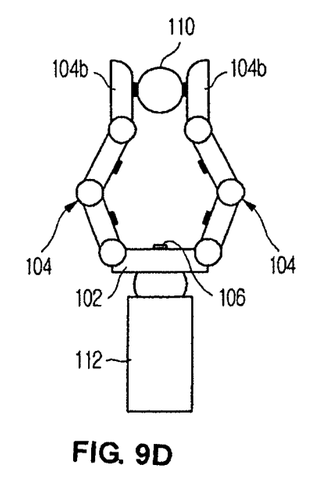

In order to substantially grip the object 110, the tip segments 104b of the plurality of fingers 104 respectively approach the object 110 at uniform distance and speed (808; with reference to FIG. 9C). The distances between the tip segments 104b of the plurality of fingers 104 and the object 110 are gradually decreased while the distances between the tip segments 104b and the object 110 are equally maintained. When the tip segments 104b of the plurality of fingers 104 approach the vicinity of the object 110, the robot hand 100 is controlled such that all the tip segments 104b of the plurality of fingers come into contact with the object 110 concurrently (810; with reference to FIG. 9D). Thereafter, the robot hand 100 generates a designated force to safely grip the object 110, and thus grips the object 110 (812).

As described above, when the object 110 to be gripped has a quite small size, the object 110 is gripped using only the tip segments 104b of the plurality of fingers 104 rather than the whole robot hand 100, and thus it is possible to reduce a frequency of use of the distance sensors 108 and a quantity of calculation.

Figure 10:
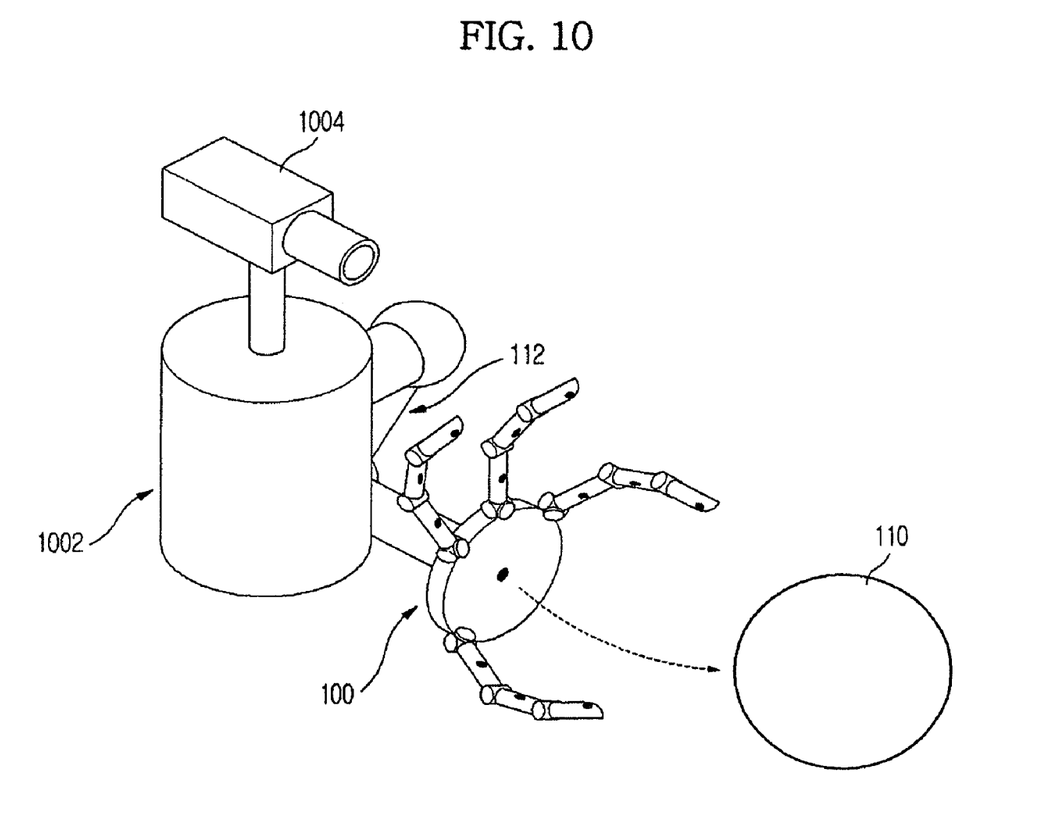
FIG. 10 is a view illustrating a robot having a vision system in accordance with a fifth embodiment of the present invention.

FIG. 10 is a view illustrating a robot having a vision system in accordance with a fifth embodiment of the present invention. A robot 1002 of FIG. 10 includes a robot hand 100, and an arm 112, which are the same as those of FIG. 1 and FIGS. 2A to 2C. The robot 1002 further includes a vision system 1004, which is an image device to obtain an image around the robot 1002. Particularly, the vision system 1004 is used to obtain a relative position of the object 100 to the robot hand 100 and then to allow the robot hand 100 to secure a route to approach the object 110.

Figure 11:
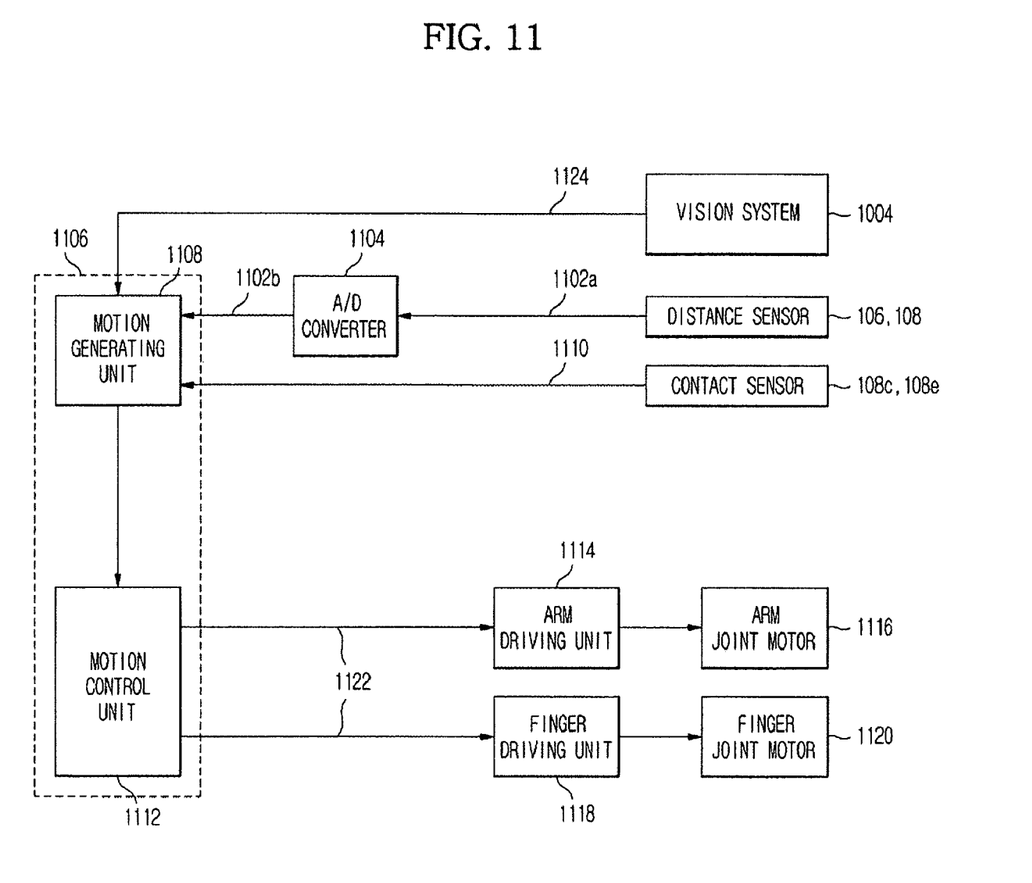
FIG. 11 is a block diagram illustrating a control system of a robot hand of FIG. 10.

FIG. 11 is a block diagram illustrating a control system of the robot hand of FIG. 10. As shown in FIG. 11, the distance sensors 106 and 108 measure distance data between the distance sensors 106 and 108 and the object 110, and generate an analog distance signal 1102a. An A/D converter 1104 converts the analog distance signal 1102a into a digital distance value 1102b, and transmits the digital distance value 1102b to a motion generating unit 1108 of a calculating unit 1106. The contact sensors 108c and 108e generate an ON/OFF-type digital contact signal 1110 according to whether or not the contact sensors 108c and 108e contact the object 110, and transmit the digital contact signal 1110 to the motion generating unit 1108 of the calculating unit 1106. When the contact sensors 108c and 108e not only detect whether or not the contact sensors 108c and 108e contact the object 110 but also measure an applied pressure generated when the contact sensors 108c and 108e contact the object 110, the contact sensors 108c and 108e generate an analog pressure signal representing the degree of the applied pressure when the contact sensors 108c and 108e contact the object 110, and the A/D converter 1104 converts the analog pressure signal into a digital pressure value and transmits the digital pressure value to the motion generating unit 1108 of the calculating unit 1106.

The vision system 1004 serves to obtain image data 1124 around the robot 1002, particularly the relative position data of the object 110 to the robot hand 100. The image data 1124 is used to cause the robot hand 100 to approach the object 110 so as to perform a given operation.

The motion generating unit 1108 expects a target motion of the robot hand 100 and the arm 112 based on the image data 1124 around the robot 1002, the digital distance value 1102b, and the digital contact signal 1110, and transmits corresponding data to a motion control unit 1112. The target motion is a motion, which is taken by the robot hand 100, in order to conduct an operation given to the robot hand 100. The motion control unit 1112 receives the data of the expected target motion, and generates a target control input 1122 controlling the robot hand 100 and the arm 112 (including a wrist joint). Here, the target control input 1122 includes target speeds and target torques of motors. The target control input 1122 generated by the motion control unit 1112 is used to control an arm joint motor 1116 through an arm driving unit 1114 and control a finger joint motor 1120 through a finger driving unit 1118.

Figure 12:
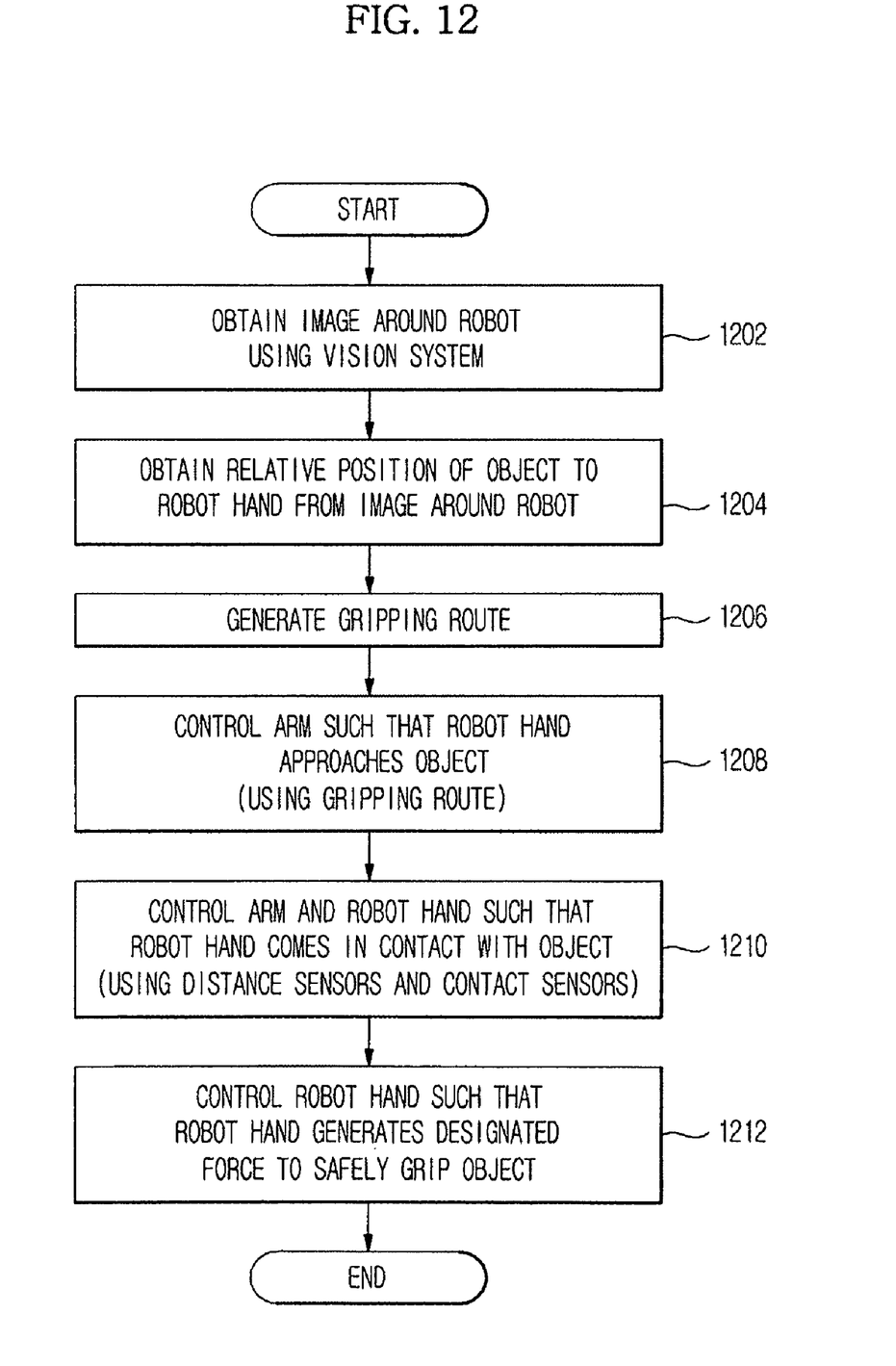
FIG. 12 is a flow chart illustrating a method of controlling a robot in accordance with a sixth embodiment of the present invention.

FIG. 12 is a flow chart illustrating a method of controlling a robot in accordance with a sixth embodiment of the present invention. Particularly, in the method of FIG. 12, the relative position of the object 110 to the robot hand 100 is obtained using a vision system, and a gripping route to cause the robot hand 100 to approach the object is obtained based on the relative position. As shown in FIG. 12, an image around the robot 1002 is obtained using the vision system 1004 (1202). The motion generating unit 1108 obtains the relative position of the object 110 to the robot hand 100 from the image around the robot 1002 (1204), and generates the gripping route to cause the robot hand 100 to approach the object 110 based on the relative position (1206). When the gripping route is generated, the arm 112 is controlled such that the robot hand 100 approaches the object 110 along the gripping route (1208). When the robot hand 100 approaches the object 110, the arm 112 and the robot hand 100 are controlled such that the robot hand 100 comes in contact with the object 110 (1210). This contact is achieved using measured results of the distance sensors 106 and 108 and the contact sensors 108c and 108e installed on the palm 102 and the plurality of fingers 104. Thereafter, the robot hand 100 generates a designated force to safely grip the object 110, and thus grips the object 110 (1212).

Figure 13A:
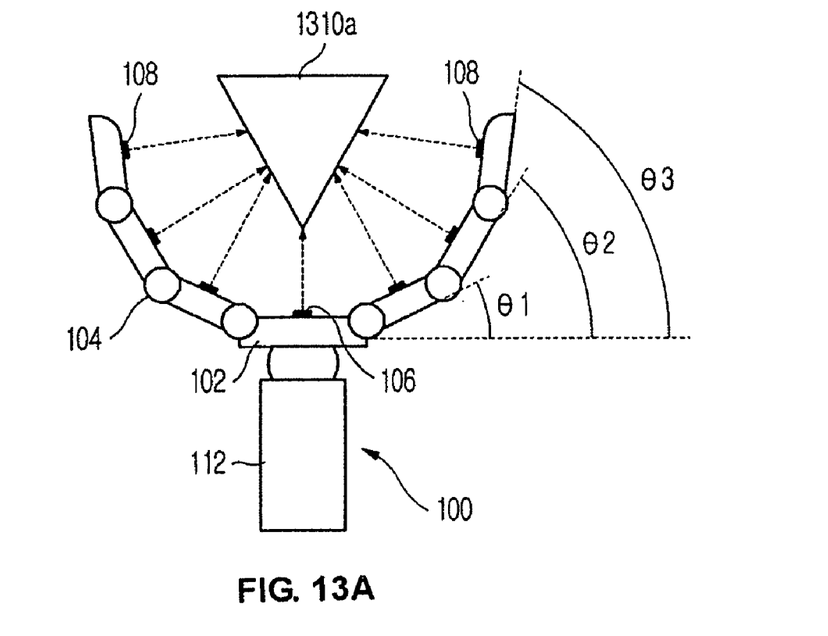
FIGS. 13A and 13B are views illustrating a method of controlling a robot hand in accordance with a seventh embodiment of the present invention.
Figure 13B:
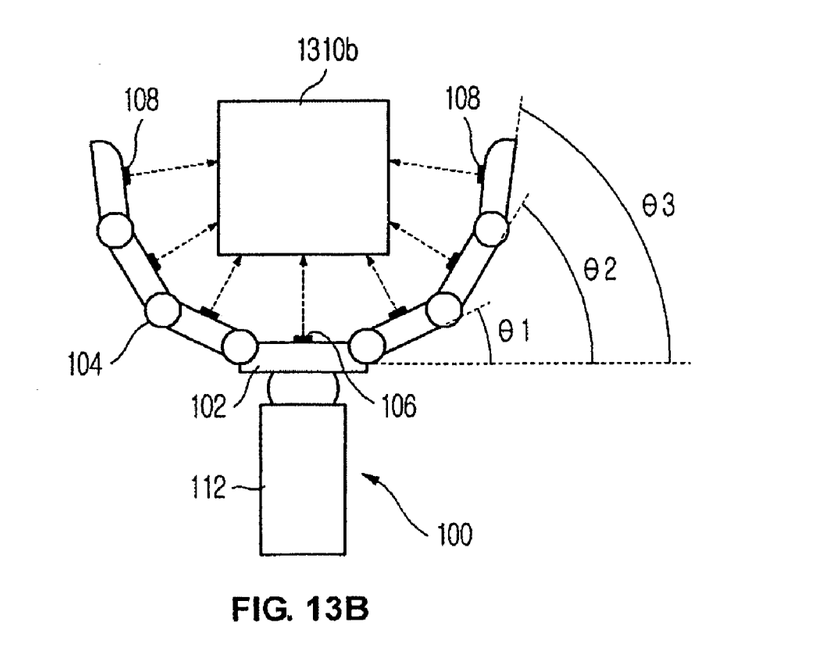

FIGS. 13A and 13B are views illustrating a method of controlling a robot hand in accordance with a seventh embodiment of the present invention. As shown in FIGS. 13A and 13B, it is possible to recognize the shape of an object 1310a or 1310b using a plurality of distance sensors 108 installed on the robot hand 100. When the relative angles ($\theta 1$, $\theta 2$, and $\theta 3$) of the plurality of fingers 104 to the palm 102 of the robot hand 100 are regular and are known in advance, distance values detected by the respective distance sensors 108 are different according to the shape of the object 1310a or 1310b. Thus, when the robot hand 100 is controlled such that the relative angles ($\theta 1$, $\theta 2$, and $\theta 3$) of the plurality of fingers 104 to the palm 102 of the robot hand 100 have predetermined values, the shape of the object 1310a or 1310b is determined through the distance values respectively detected by the plurality of distance sensors 108.

As apparent from the above description, the embodiment of the present invention provides a robot, a robot hand, and a method of controlling the robot hand, in which the robot hand rapidly and correctly approaches an object to be gripped and safely grips the object regardless of the shape and material of the object.

Particularly, in the robot, the robot hand, and the method of controlling the robot hand, it is possible to measure a distance with the object without moving the robot hand.

Although embodiments of the invention have been shown and described, it would be appreciated by those skilled in the art that changes may be made in these embodiments without departing from the principles and spirit of the invention, the scope of which is defined in the claims and their equivalents.

What is claimed is:

1. A method of controlling a robot hand, comprising a palm, and a plurality of fingers, each having a plurality of segments, each of the fingers being connected to the palm, comprising:
    measuring at least one distance to an object using at least one first distance sensor installed on the palm;
    measuring at least one distance to the object using at least one second distance sensor installed on the plurality of fingers;
    causing the palm to approach an object using the at least one first distance sensor installed on the palm;
    causing the plurality of fingers to approach the object using the at least one second distance sensor installed on the plurality of fingers; and
    causing the palm and the plurality of fingers to come into contact with the object to grip the object,
    wherein the at least one first distance sensor and the at least one second distance sensor measure a distance to the object by selectively using a distance sensor depending on whether the distance to the object exceeds a predetermined distance.

2. The method according to claim 1, wherein the plurality of fingers approach the object in the order from base segments of the plurality of fingers to tip segments of the plurality of fingers.

3. The method according to claim 1, wherein the palm and base segments and tip segments of the plurality of fingers approach the object concurrently at a uniform distance and speed.

4. The method according to claim 1, further comprising controlling the robot hand such that the object is located at the central portion of the robot hand, prior to the approach of the palm to the object.

5. The method according to claim 1, further comprising generating a gripping route and causing the robot hand to approach the object along the gripping route, prior to the approach of the palm to the object.

6. The method according to claim 5, further comprising controlling the robot hand such that the robot hand generates a designated force to safely grip the object.

7. The method according to claim 5, wherein the gripping route is generated using an image device to obtain a relative position of the object to the robot hand.

8. The method according to claim 1, further comprising measuring the distances between the first and second distance sensors and the object, wherein the at least one first distance sensor and the at least one second distance sensor are sequentially operated with a time difference, when the distances between the at least one first and second distance sensors and the object are measured, to prevent interference between the at least one first and second distance sensors.

9. The method according to claim 1, wherein the palm contacts the object first, and then the plurality of fingers sequentially contact the object in the order from base segments of the plurality of fingers to tip segments of the plurality of fingers, while increasing a force to grip the object.

10. The method according to claim 1, wherein the at least one first distance sensor and at least one second distance sensor include an ultrasonic sensor, an infrared sensor, a laser sensor, and/or a position sensitive device (PSD).

11. The method according to claim 1, wherein:
    the at least one first distance sensor installed on the palm measures a first distance to the object greater than the predetermined distance,
    the at least one second distance sensor installed on the plurality of fingers measures a second distance to the object less than the predetermined distance, and
    the at least one first distance sensor includes at least one laser sensor to measure the first distance, and the at least one second distance sensor includes at least one ultrasonic sensor to measure the second distance.

12. The method according to claim 1, further comprising:
    sensing whether the robot hand contacts the object using at least one contact sensor; and
    measuring a force applied to the robot hand when the robot hand contacts the object.

* * * * *